(12) United States Patent
Hada

(10) Patent No.: US 9,386,219 B2
(45) Date of Patent: Jul. 5, 2016

(54) IMAGING APPARATUS AND METHOD FOR CONTROLLING THE SAME

(71) Applicant: CANON KABUSHIKI KAISHA, Tokyo (JP)

(72) Inventor: Tetsuya Hada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/697,618

(22) Filed: Apr. 27, 2015

(65) Prior Publication Data

US 2015/0319362 A1 Nov. 5, 2015

Related U.S. Application Data

(63) Continuation of application No. 13/227,332, filed on Sep. 7, 2011, now Pat. No. 9,030,593.

(30) Foreign Application Priority Data

Sep. 10, 2010 (JP) .................................. 2010-203156

(51) Int. Cl.
| | |
|---|---|
| G02B 7/04 | (2006.01) |
| H04N 5/232 | (2006.01) |
| H04N 9/73 | (2006.01) |
| H04N 5/235 | (2006.01) |
| G02B 7/10 | (2006.01) |

(52) U.S. Cl.
CPC ............ *H04N 5/23222* (2013.01); *G02B 7/102* (2013.01); *H04N 5/2353* (2013.01); *H04N 5/23212* (2013.01); *H04N 5/23293* (2013.01); *H04N 5/23296* (2013.01); *H04N 9/735* (2013.01)

(58) Field of Classification Search
None
See application file for complete search history.

(56) References Cited

U.S. PATENT DOCUMENTS

| | | | | |
|---|---|---|---|---|
| 2005/0063693 | A1* | 3/2005 | Yoshibe | G02B 7/28 396/81 |
| 2007/0172224 | A1* | 7/2007 | Yukitake | G03B 17/20 396/287 |
| 2009/0268079 | A1* | 10/2009 | Motomura | H04N 5/23212 348/347 |

* cited by examiner

*Primary Examiner* — Kevin McInnish
(74) *Attorney, Agent, or Firm* — Canon U.S.A., Inc. IP Division

(57) ABSTRACT

An imaging apparatus is capable of preventing unintended shooting setting when a through-image is displayed at a zoom position different from a field angle for reach shooting. The imaging apparatus includes a recording control unit configured to record a zoom position taken before a start of a function for temporarily changing the zoom position as a first position, a zoom control unit configured to perform control to move the zoom position from the first position to a second position when the function is started, and from the second position to the first position when the function is ended, and a control unit configured to perform control, when the zoom position is at the second position by the function, not to make any changes according to an instruction for changing specific shooting setting.

29 Claims, 7 Drawing Sheets

IMAGING APPARATUS AND METHOD FOR CONTROLLING THE SAME

RELATED APPLICATIONS

This application is a Continuation of U.S. patent application Ser. No. 13/227,332 filed on Sep. 7, 2011 which claims the benefit of Japanese Application No. 2010-203156 filed Sep. 10, 2010, which are hereby incorporated by reference herein in their entirety.

FIELD OF THE INVENTION

The present invention relates to an imaging apparatus having a function that facilitates setting of an object to be captured within a shooting range when zoomed, and an imaging method.

DESCRIPTION OF THE RELATED ART

In recent years, a magnification has become higher and higher in an imaging apparatus such as a digital camera. In an imaging apparatus that has a zoom function of a high magnification, even a slight movement of an object may cause framing-out during field angle adjustment in an ultratelephoto state. Even a small panning operation by a photographer having a camera set ready causes a great change in a field angle range. In such an ultratelephoto state, framing of the moving object to a desired field angle is difficult. To deal with this problem, Japanese Patent Application Laid-Open No. 2006-019852 has proposed an imaging apparatus that can easily track a distant moving object.

The imaging apparatus discussed in Japanese Patent Application Laid-Open NO. 2006-019852 performs through-image displaying in a shooting standby state with a zoom lens set on a wide-angle side, and displays, as a frame, a portion that becomes a shooting range when zooming-in by a predetermined magnification on the through-image. When a shutter button is half-pressed in this state, the zoom lens is driven to zoom-in by the predetermined magnification. When the shutter button is fully pressed in this state, real shooting can be performed in the zoomed-in state. When the shutter button is released, the zoom lens is driven to zoom out to an original zoom position of the wide-angle side. Hence, the distant moving object can be easily set within the shooting range during the zooming-in.

According to the method discussed in Japanese Patent Application Laid-Open No. 2006-019852, the through-image displaying at the zoom position is performed on the angle side wider than a field angle for real shooting. Consequently, when shooting setting is changed while checking effects by the through-image of the wide-angle side, the real shooting is performed by zooming-in greater than that shown during the through-image displaying. This may prevent achievement of the effects checked by the through-image. For example, when exposure is adjusted based on the through-image of the wide-angle side, an amount of light acquired during the real shooting may be reduced by an amount of the zooming-in, thus making an actually captured image darker than that checked by the through-image. Even when exposure is adjusted to be suitable to the entire through-image of the wide-angle side, the image may be too bright or dark if the same exposure is set with respect to the shooting range zoomed-in during the rear shooting. When a focus is adjusted to be fixed during the through-image displaying of the wide-angle side, during the real shooting, adjustment may be misaligned between the zoom lens and a focus lens by an amount of the zooming-in, causing a blurred image in the real shooting. Similarly for other setting items, when setting is adjusted for shooting at a zoom position different from the zoom position of the real shooting, and the real shooting is performed on that setting while changing the zoom position, a user may not be able to acquire a desired image.

SUMMARY OF THE INVENTION

The present invention is directed to prevention of capturing of an image unintended by a user due to changing of shooting setting when through-image displaying is performed at a zoom position set differently from a field angle for real shooting.

According to an aspect of the present invention, an imaging apparatus includes an operation unit configured to instruct change of shooting setting, an instruction unit configured to instruct a start or an end of a function for temporarily changing a zoom position, a recording control unit configured to record a zoom position taken before the start of the function as a first position in a recording unit, a zoom control unit configured to perform control to move the zoom position from the first position to a second position according to an instruction for starting the function from the instruction unit, and from the second position to the first position recorded in the recording unit according to an instruction for ending the function from the instruction unit, and a control unit configured to perform control, when the zoom position is at the second position under control of the zoom control unit, not to make any changes according to an instruction for changing specific shooting setting from the operation unit.

The present invention can reduce a possibility of capturing the image unintended by the user due to changing of the shooting setting when the through-image displaying is performed at the zoom position set differently from the field angle for real shooting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

An imaging apparatus according to the present exemplary embodiment includes a FA button in addition to a zoom button, stores a current zoom position by pressing the FA button, and drives zooming to a wide field angle position acquired based on a current zoom magnification. The imaging apparatus then returns the zooming to the stored zoom position by releasing the FA button. Hereinafter, this function is referred to as a FA function. According to an example of the present exemplary embodiment, control is performed not to receive any change of shooting setting in the imaging apparatus during execution of the FA function.

Figure 1:
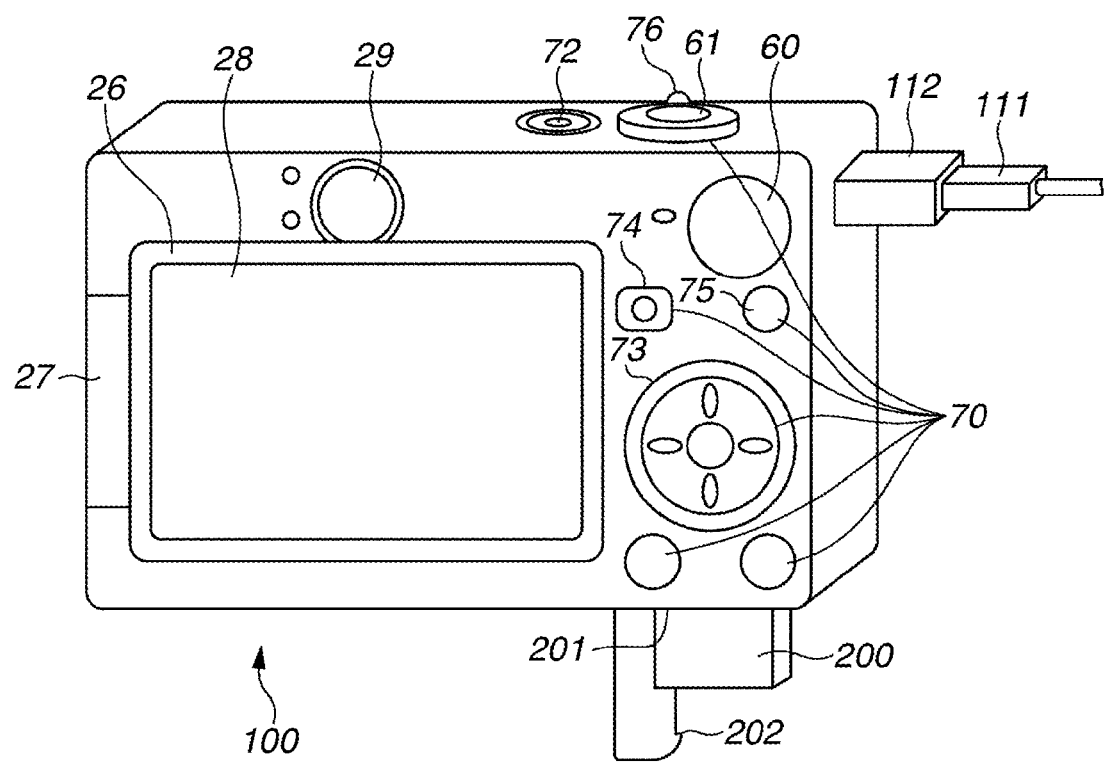
FIG. 1 is an appearance diagram illustrating a back face of a digital camera according to an exemplary embodiment of the present invention.

FIG. 1 is an appearance diagram illustrating a back face of a digital camera 100 as an example of the imaging apparatus according to the present invention. The digital camera includes a display unit 28 that displays images or various pieces of information, a shutter button 61 for giving a shooting instruction, a mode dial 60 for switching various modes, a connector 12 that connects a connection cable to the digital camera 100, an operation unit 70 that includes various switches, buttons, and a touch panel to receive various operations from a user, a controller wheel 73 in the operation unit which is rotatable, a power switch 72 for switching power ON and OFF, a recording medium 200 such as a memory card or a hard disk, a recording medium slot 201 for storing the recording medium 200, the recording medium 200 stored in the recording medium slot 201 which can communicate with the digital camera 100, and a cap 203 for the recording medium slot 201.

A moving image button 74 is one of the buttons included in the operation unit 70, which receives an instruction of starting or ending (stopping) capturing of a moving image. A FA button 75 is one of the buttons included in the operation unit 70, which receives an instruction of executing a FA function. A zoom lever 76 is one of the members included in the operation unit 70, which can be operated clockwise or anti-clockwise around the shutter button 61, and receives an instruction of zooming in/out at an optical zoom or an electronic zoom according to an operation direction.

A Bali angle monitor unit 26 is a case provided with the display unit 28, which is rotatably connected to a body of the digital camera 100 via a hinge unit 27. The Bali angle monitor unit 26 is movable to at least the following positions with respect to the body, a location of which can be detected by a system control unit 50 described below.

Namely, a position illustrated in FIG. 1 where a display surface of the display unit 28 is folded and exposed (first position);

a face-to-face position when the display unit 28 is opened so that the display surface of the display unit 28 can face a direction of a front surface of the digital camera 100 (surface provided with a lens into which object light enters), and the display surface of the display unit 28 can be viewed from an object side to be shot) (second position);

a position when the display unit 28 is opened so that the display surface of the display unit 28 can be viewed from the back face side of the digital camera 100 (third position); and a closed position where the display surface of the display unit 28 faces the back face of the digital camera 100, and is folded and is not seen (fourth position).

An eyepiece display unit 29 is a peer-through viewfinder, and a display disposed in the inside functioning as an electronic viewfinder (EVF) can be viewed by peering-through.

Figure 2:
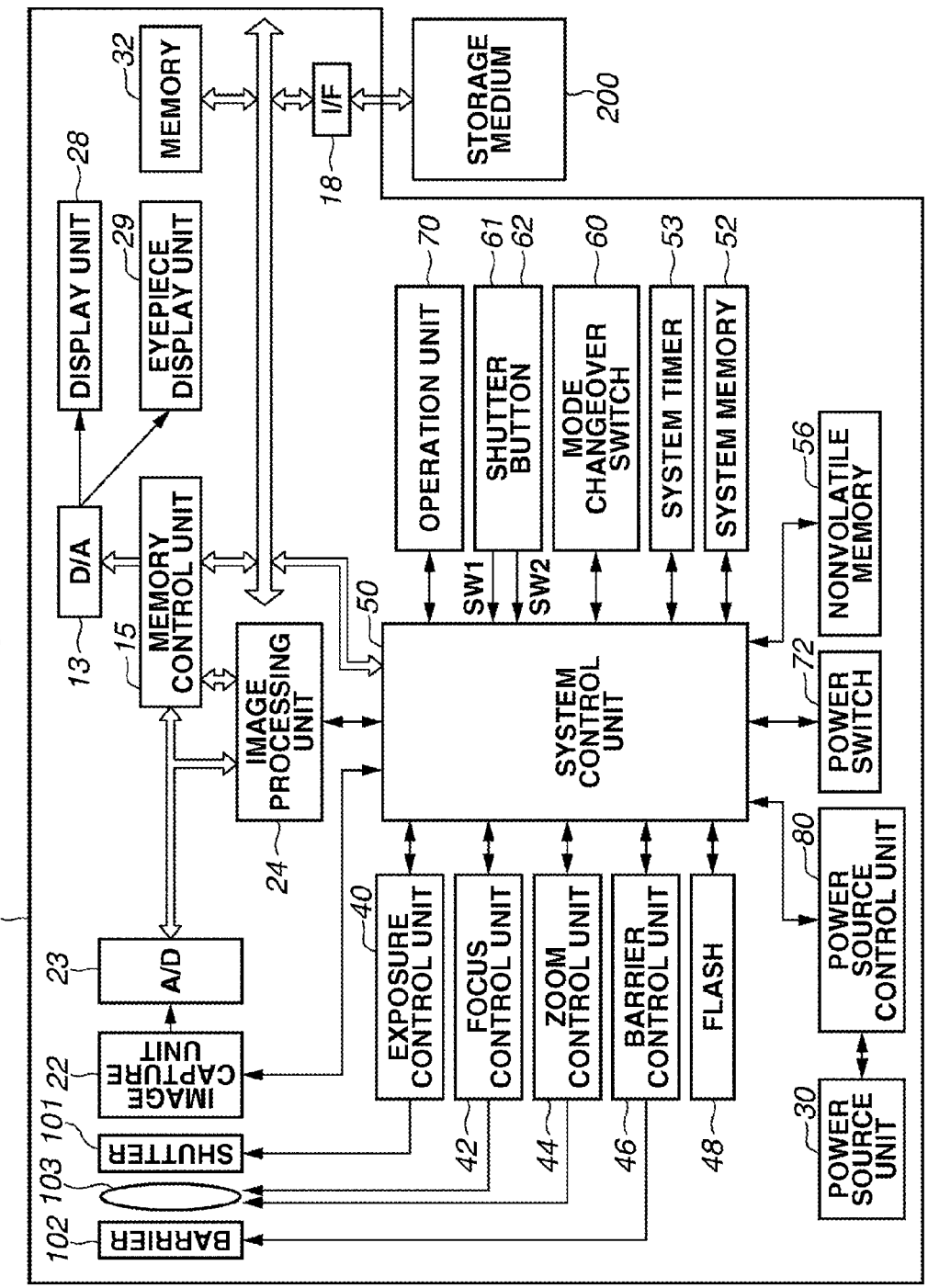
FIG. 2 is a block diagram illustrating a configuration of the digital camera according to the exemplary embodiment of the present invention.

FIG. 2 is a block diagram illustrating a configuration example of the digital camera 100 illustrated in FIG. 1.

In FIG. 2, a photographic lens group 103 includes a zoom lens and a focus lens. A shutter 101 has a diaphragm function. An image capture unit 22 includes a charge-coupled device (CCD) or a metal-oxide semiconductor element that converts an optical image into an electric signal. An analog/digital (A/D) converter 23 is used for converting an analog signal output from the image capture unit 22 into a digital signal. A barrier 102 covers the image capture unit including the photographic lens 103 of the digital camera 100 to prevent an imaging system including the photographic lens 103, the shutter 101, and the image capture unit 22 from being stained or damaged.

An image processing unit 24 performs predetermined pixel interpolation or color conversion of data from the A/D converter 23 or data from a memory control unit 15. The image processing unit 24 performs predetermined calculation by using captured image data, and the system control unit 50 performs autofocus (AF) processing, automatic exposure (AE), and preliminary flash light emission (EF) based on a result of the calculation. The image processing unit 24 further performs predetermined calculation by using the captured image data, and performs automatic white balance (AWB) processing based on a result of the calculation.

Output data from the A/D converter 23 is directly written in a memory 32 via the image processing unit 24 and the memory control unit 15, or via the memory control unit 15. The memory 32 stores image data acquired by the image capture unit 22 and converted into digital data by the A/D converter 23, or image data to be displayed by the display unit 28 or the eyepiece display unit 29. The memory 32 has a storage capacity enough to store the predetermined number of still images, a moving image of a predetermined period of time, and a voice.

The memory 32 also serves as an image display memory (video memory). A digital/audio (D/A) converter 13 converts the image display data stored in the memory 32 into an analog signal to supply it to the display unit 28. The display image data written in the memory 32 is thus displayed by the display unit 28 or the eyepiece display unit 29 via the D/A converter 13. The display unit 28 displays an image on a display such as a liquid crystal display (LCD) according to the analog signal from the D/A converter 13. The digital signal subjected to A/D conversion by the A/D converter 24 and stored in the memory 32 is subjected to analog conversion by the D/A converter 13, and sequentially transferred to the display unit 28, thereby realizing an electronic viewfinder (through-image displaying). The eyepiece display unit 29 is disposed in the peer-through viewfinder, and can display an image similar to the display unit 28. The system control unit 50 performs control to determine whether the display unit 28 or the eyepiece display unit 29 is used to perform displaying based on a detected location of the Bali angle monitor unit 26. For example, when the Bali angle monitor unit 26 is in the first position, the display unit 28 is used to perform displaying while turning OFF the eyepiece display unit 29 to save power. When the Bali angle monitor unit 26 is in the fourth position, the eyepiece display unit 29 is turned ON to perform displaying while turning OFF the display unit 28 to save power. The display unit 28 and the eyepiece display unit 29 can arbitrarily be switched ON/OFF according to a user's instruction. The display unit 28 and the eyepiece display unit 29 can display the same display contents, and hence only displaying by the display unit 28 is described below. However, similar displaying can be performed by the eyepiece display unit 29.

An exposure control unit 40 controls the shutter 101 having the diaphragm function, and associates with a flash 48 to perform a flash exposure compensation function.

A focus control unit 42 controls focusing by driving the focus lens included in the photographic lens 103. A zoom control unit 44 controls zooming by driving the zoom lens included in the photographic lens 103. A barrier control unit 46 controls an operation of the barrier 102.

The flash 48 performs a light projection function of AF auxiliary light, and a flash exposure compensation function.

The exposure control unit 40 and the focus control unit 42 are controlled by using a through-the-lens (TTL) method. Based on a result of calculating the captured image data by the image processing circuit 20, the system control unit 50 controls the exposure control unit 40 and the focus control unit 42.

A nonvolatile memory 56 is an electrically erasable/recordable memory and, for example, an electrically erasable programmable read-only memory (EEPROM) is used. The nonvolatile memory 56 stores a constant and a program to operate the system control unit 50. The program is configured to execute processing of various flowcharts of the present exemplary embodiment described below.

The system control unit 50 controls the digital camera 100 as a whole. Each processing of the present exemplary embodiment described below is achieved by executing the program recorded in the nonvolatile memory 56. A random access memory (RAM) is used as a system memory 52. In the system memory 52, the constant, a variable, or the program read from the nonvolatile memory 56 for operating the system control unit 50 is rasterized. The system control unit 50 also controls displaying by controlling the memory 32, the D/A converter 13, the display unit 28, or the eyepiece display unit 29.

A system timer 53 measures time used for various controls, or time of a built-in clock.

A mode changeover switch 60, a first shutter switch 62, a second shutter switch 64, and the operation unit 70 are used to input various operation instructions of the system control unit 50.

The mode changeover switch 60 switches an operation mode of the system control unit 50 to one of a still image recording mode, a moving image recording mode, and a reproducing mode. The first shutter switch 62 is turned ON in the middle of an operation of the shutter button 61 included in the digital camera 100, in other words, by half-pressing (shooting preparation instruction), to generate a first shutter switch signal SW1. Based on the first shutter switch signal SW1, a shooting preparation such as AF processing, AE, AWB processing, or EF is started.

The second shutter switch 64 is turned ON when the operation of the shutter button 61 is completed, in other words, by full-pressing (shooting instruction), to generate a second shutter switch signal SW2. Based on the second shutter switch signal SW2, the system control unit 50 starts a series of shooting operations from signal reading from the image capture unit 22 to writing of image data in the recording medium 200.

The operation members of the operation unit 70 perform suitable functions allocated to respective scenes by selecting various function icons displayed by the display unit 28, and serve as various function buttons. The function buttons include, for example, an end button, a return button, an image feed button, a jump button, a refine button, and an attribute change button. For example, when a menu button is pressed, a menu screen is displayed by the display unit 28 to enable setting of various operations. The user can intuitively set various operations by using the menu screen displayed by the display unit 28, a four-direction button, and a SET button.

A power source control unit 80 includes a battery detection circuit, a direct current (DC)-DC converter, and a switch circuit that switches a block to be energized, and detects presence of a loaded battery, a type of the battery, and a residual amount of the battery. The power source control unit 80 controls, based on the detection result and an instruction from the system control unit 50, the DC-DC converter to supply necessary power to the respective units including the recording medium 200 in a required period.

A power source unit 30 includes a primary battery such as an alkaline battery or a lithium battery, a secondary battery such as a NiCd battery, a NiMH battery or a Li battery, or an alternative current (AC) adapter. An interface 18 is used to connect with the recording medium 200 such as a memory card or a hard disk. The recording medium 200 such as a memory card includes a semiconductor memory or a magnetic disk.

Figure 3:
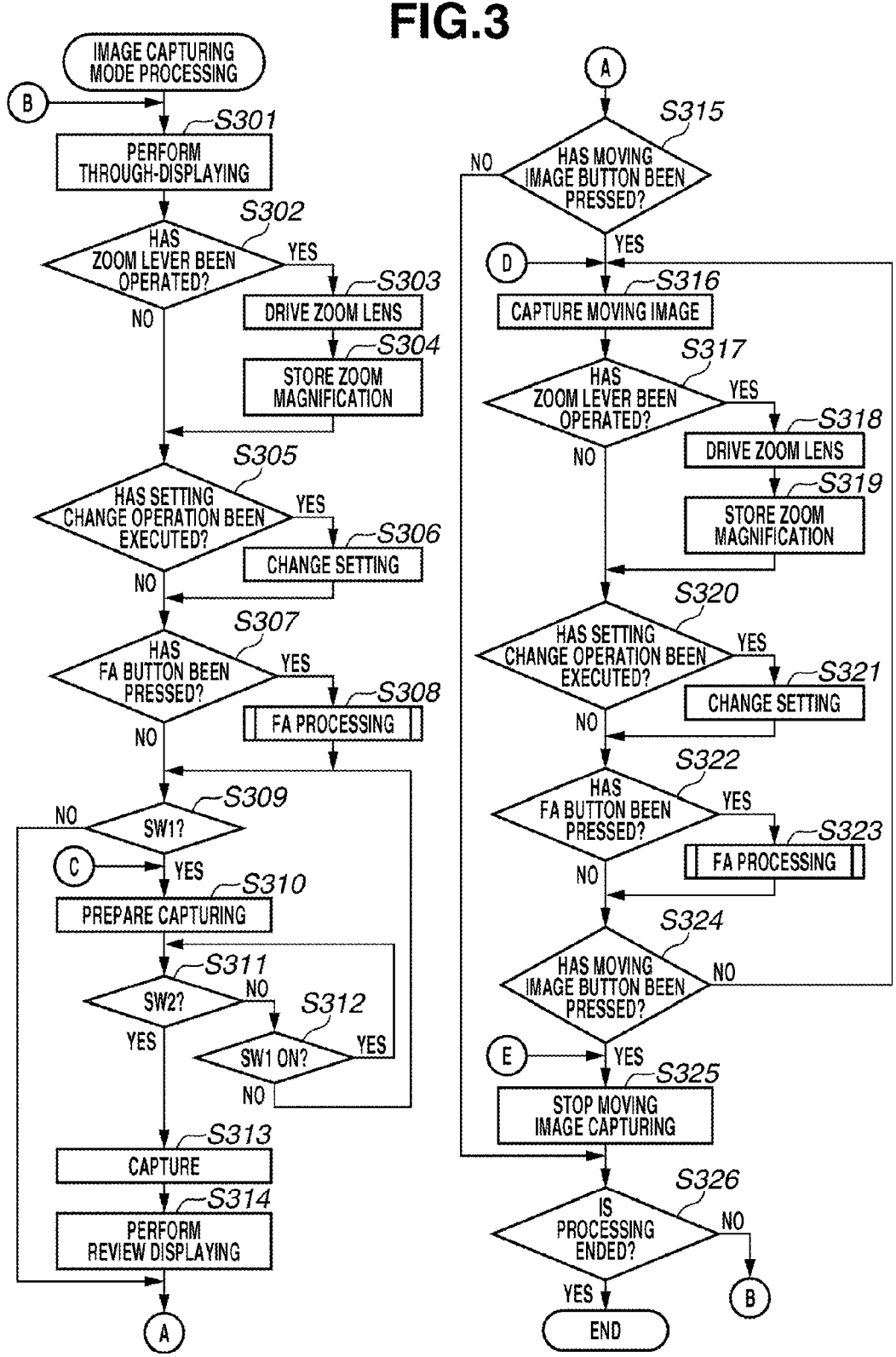
FIG. 3 is a flowchart illustrating shooting mode processing according to the present invention.

FIG. 3 is a flowchart illustrating shooting mode processing according to the first exemplary embodiment. This processing is achieved by rasterizing and executing the program recorded in the nonvolatile memory 56 in the system memory 52 via the system control unit 50. When the digital camera 100 is turned ON, and a mode is switched to the shooting mode by the mode dial 60, a shooting standby state is set, thereby starting the processing illustrated in FIG. 3.

In step S301, through-image displaying is performed. In the through-image displaying, to execute framing, images captured by the image capture unit 22 are sequentially displayed in real time by the display unit 28 before real shooting.

In step S302, whether the zoom lever 76 has been operated is determined. The processing proceeds to step S303 when it is determined that the zoom lever 76 has been operated (YES in step S302). The processing proceeds to step S305 when the zoom lever 76 has not been operated (NO in step S302).

In step S303, based on an operation direction and an operation amount of the zoom lever 76, an instruction is issued to the zoom control unit 44 to drive the zoom lens (optical zoom). When the zoom lever 76 is operated to a wide-angle side in a state where the zoom lens has reached a wide-angle end, the zoom lens is not driven. When the zoom lever 76 is operated to a telephoto side in a state where the zoom lens has reached a telephoto end, zooming-in is executed by the electronic zoom without driving the zoom lens.

In step S304, a current zoom magnification that is a result of the zoom lens driving (or electronic zooming) in step S303 is recorded in the system memory 52. The zoom magnification is from the wide-angle end. A lens position of the zoom lens and an electronic zoom magnification can be recorded in place of the zoom magnification.

In step S305, whether a setting change operation has been performed by the operation unit 70 is determined. The processing proceeds to step S306 when the setting change operation has been performed (YES in step S305). The processing proceeds to step S307 when the setting change operation has not been performed (NO in step S305).

In step S307, various setting changes are executed according to operation contents of the operation unit 70.

Figure 4:
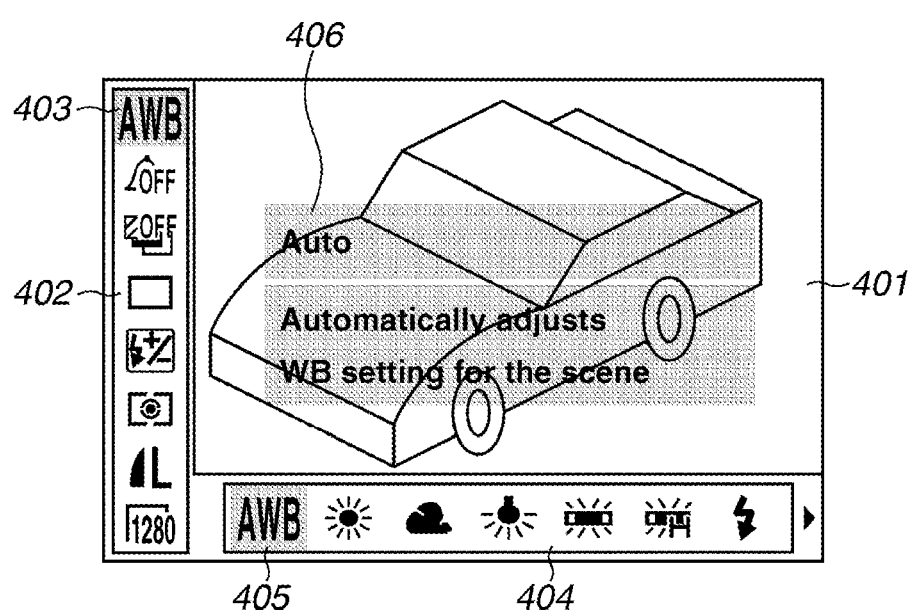
FIG. 4 illustrates a screen display example when shooting setting is changed in a shooting standby state.

FIG. 4 illustrates a screen display example displayed by the display unit 28 during the setting change in step S306. The screen illustrated in FIG. 4 is displayed to change setting (shooting setting) regarding shooting when it is determined in step S305 that the Function button included in the operation unit 70 has been pressed. When the Function button is pressed being superimposed on a through-image 401 displayed before the pressing of the Function button, a shooting setting item icon group 402, a shooting setting icon group 404, and guidance 404 are displayed. The user selects a desired shooting setting item icon from the shooting setting item icon group 402 on the screen illustrated in FIG. 4 by operating the four-direction button included in the operation unit 70. The user then selects a desired shooting setting icon from the shooting setting icon group 404 corresponding to an item indicated by the selected shooting setting item icon. The user can accordingly set shooting as indicated by the selected shooting setting icon.

A frame 403 is a selection frame indicating a currently selected shooting setting item icon among the shooting setting item icon group 402. A frame 405 is a selection frame indicating a currently selected shooting setting icon among the shooting setting icon group 404. The guidance 406 illustrates a content of shooting setting to be made by the currently selected shooting setting icon. In the example illustrated in FIG. 4, icons displayed in the shooting setting item icon group 402 indicate, from the top, white balance adjustment, color setting, bracket shooting, continuous shooting and stroboscopic light control settings, photometric area setting, still image compression rate/recording pixel number setting, and moving image size setting. Shooting setting icons displayed in the shooting setting icon group 404 are included in white balance adjustment items selected in the shooting setting item icon group 402, which indicate, from left, automatic, sunlight, cloud, electric bulb, fluorescent lamp, fluorescent lamp H, and stroboscopic white balance settings. The guidance 406 displays a text illustrating a white balance setting content (auto in this case) made by the currently selected icon in the shooting setting icon group 404.

In step S306, in addition to the change of the shooting setting on the screen illustrated in FIG. 4, various shooting settings can be changed on the menu screen displayed when it is determined that the menu button is pressed in step S305. In step S305, setting can be changed based on determination that a stroboscopic setting button, a focus area (macro area or normal area) switching button, an International Organization for Standardization (ISO) sensitivity setting button, a focus lock button, or an AE lock button is pressed.

In step S307, whether the FA button 75 has been pressed is determined. When it is determined that the FA button 75 has been pressed (YES in step S307), the processing proceeds to step S308 to perform FA processing. The FA processing is described in detail below referring to FIG. 5 (which includes FIG. 5A and FIG. 5B). When it is determined that the FA button has not been pressed (NO in step S307), the processing proceeds to step S309.

In step S309, it is determined whether the shutter button 61 has been half-pressed and a first shutter switch signal SW1 has been generated. The processing proceeds to step S310 when it is determined that the first shutter switch signal SW1 has been generated (YES in step S309). When it is determined that the first shutter switch signal SW1 has not been generated (NO in step S309), the processing proceeds to step S315.

In step S310, a shooting preparation such as AF processing, AF, AWB processing, or EF is started.

In step S311, it is determined whether the shutter button 61 has been fully pressed and a second shutter switch signal SW2 has been generated. The processing proceeds to step S313 when it is determined that the second shutter switch signal SW2 has been generated (YES in step S311). When it is determined that the second shutter switch signal SW2 has not been generated (NO in step S311), the processing proceeds to step S312.

In step S312, it is determined whether the shutter button 61 has been half-pressed and the first shutter switch signal SW1 is kept ON. The processing returns to step S11 when it is determined that the first shutter switch signal SW1 is ON (YES in step S312), and stands by until the shutter button 61 is fully pressed or released while the AF or the AE determined by the shooting preparation operation is locked. The processing returns to step S309 when it is determined that the first shutter switch signal SW1 is not ON (NO in step S312).

In step S313, in response to the full-pressing of the shutter button 61, a series of still image capturing operations from signal reading from the image capture unit 22 to writing of image data in the recording medium 200 is performed (real shooting).

In step S314, review displaying of the image captured in step S313 is performed for a predetermined period (several seconds) (REC review). The review displaying automatically ends when the half-pressing of the shutter button 61 is ended or after a predetermined period.

In step S315, it is determined whether the moving image button 74 has been pressed. The processing proceeds to step S316 when it is determined that the moving image button 74 has been pressed (YES in step S315). When it is determined that the moving image button 74 has not been pressed (NO in step S315), the processing proceeds to step S326.

In step S316, a series of moving image capturing (moving image recording) operations from signal reading from the image capture unit 22 to writing of image data as a moving image in the recording medium 200 is performed.

In step S317, whether the zoom lever 76 has been operated is determined. This step S317 and subsequent steps S318 and S319 are similar to the steps S302 to S304, and thus description thereof is omitted. However, during the moving image capturing, a driving speed of the zoom lens is set lower than that in the shooting standby state in step S303 to prevent quality deterioration of the recorded moving image.

In step S320, whether a setting change operation has been performed is determined. The processing proceeds to step S321 to change setting according to the operation when it is determined that the setting change operation has been performed (YES in step S320), otherwise (NO in step S320) the processing proceeds to step S322. In this case, the number of setting items that can be subjected to the setting change operation is smaller than that in the shooting standby state in steps S305 and S306 because of the ongoing moving image capturing. Shooting settings that can be changed are, for example, manual focus setting, exposure setting, and a focus lock setting.

In step S322, whether the FA button 75 has been pressed is determined. The processing proceeds to step S323 when it is determined that the FA button 75 has been pressed (YES in step S322) to perform FA processing. The FA processing is described in detail below referring to FIG. 5 (which includes FIG. 5A and FIG. 5B). The processing proceeds to step S324 when it is determined that the FA button 75 has not been pressed (NO in step S322).

In step S324, whether the moving image button 74 has been pressed is determined. The processing proceeds to step S325 to stop (end) the moving image capturing when it is determined that the moving image button 74 has been pressed (YES in step S324). The processing proceeds to step S316 to continue the moving image capturing when it is determined that the moving image button 74 has not been pressed (NO in step S324).

In step S326, whether to end the shooting mode processing is determined. The shooting mode processing is determined to be ended when the power switch 72 is turned OFF, the mode is changed to another mode such as a reproducing mode, or power is automatically turned OFF to save power when predetermined time has passed without any operation. When the shooting mode processing is determined not to be ended (NO in step S326), the processing returns to step S301 to be repeated. When the shooting mode processing is determined to be ended (YES in step S326), the shooting mode processing is ended.

Figure 5A:
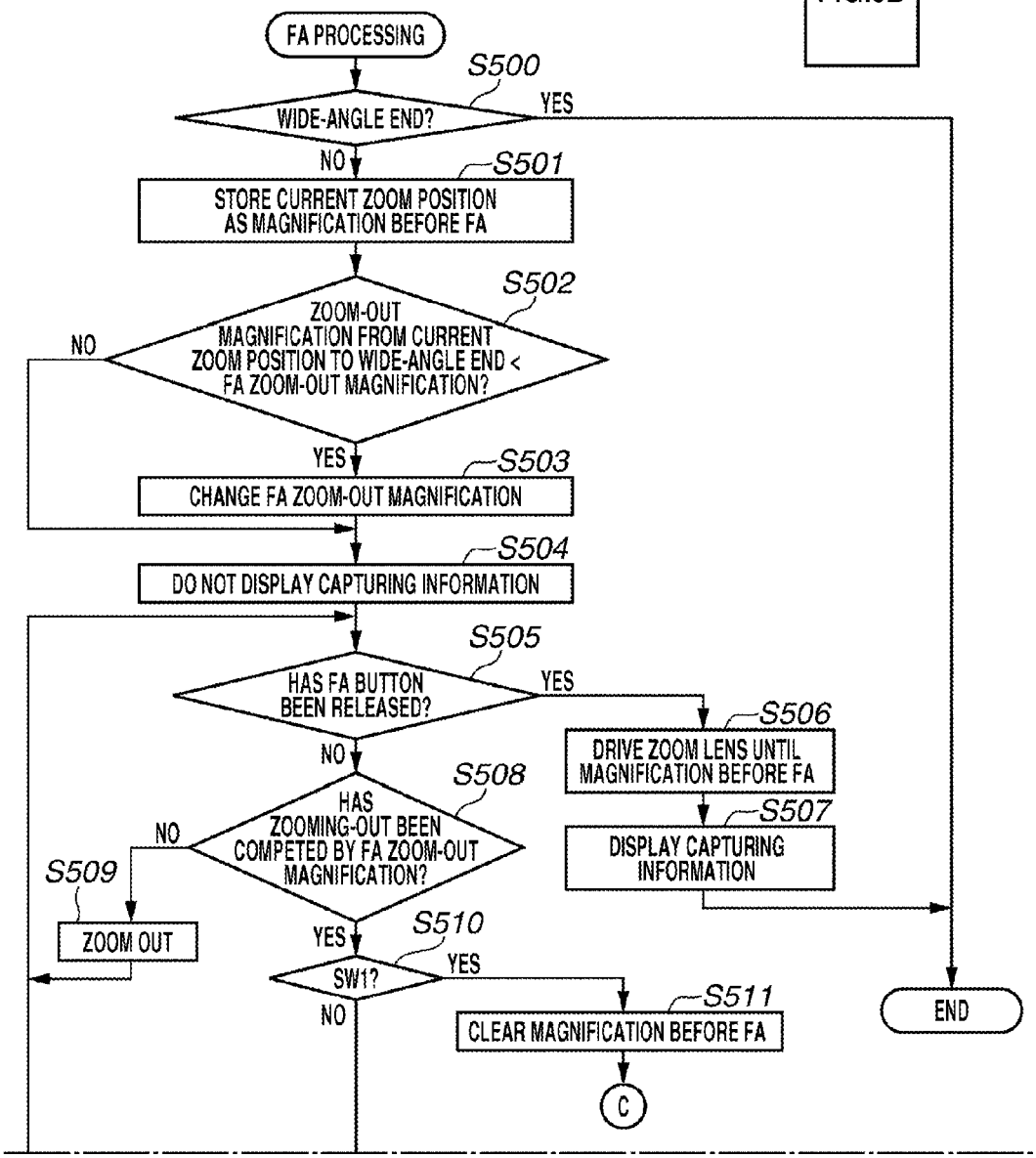
FIG. 5 (which includes FIG. 5A and FIG. 5B) is a flowchart illustrating framing assist (FA) processing according to the present invention.
Figure 5B:
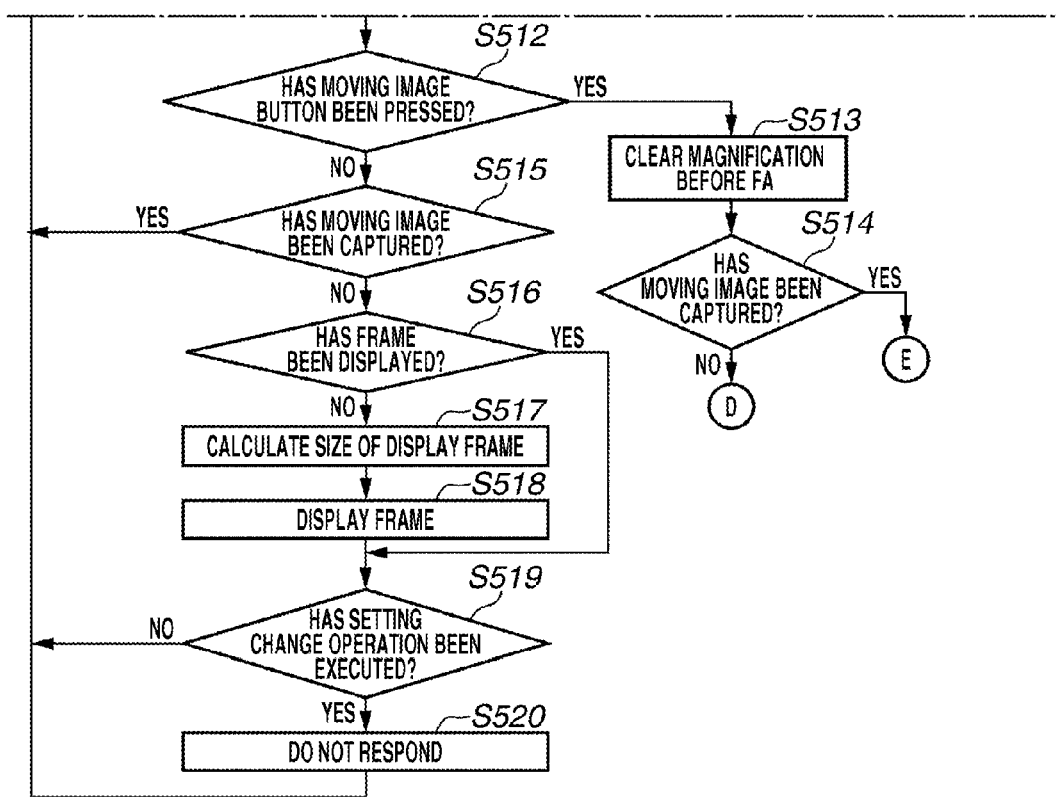

FIG. 5 (which includes FIG. 5A and FIG. 5B) is a flowchart illustrating the FA processing in steps S308 and S323 shown in FIG. 3 in detail. This processing is achieved by rasterizing in the system memory 52 and executing the program recorded in the nonvolatile memory 56 by the system control unit 50. As illustrated in FIG. 3, the FA processing is started by operating the FA button 75 in the shooting standby state or during the moving image capturing in the shooting mode.

In step S500, whether a current zoom magnification (or zoom position) is a wide-angle end is determined. When the current zoom magnification is the wide-angle end (YES in step S500), further zooming-out is not permitted, nor the FA function can be executed, and hence the FA processing is ended. In other words, in the case of the wide-angle end, the FA function is not activated even when the FA button 75 is pressed. When the current magnification is not the wide-angle end (NO in step S500), the processing proceeds to step S502.

Figure 6A:
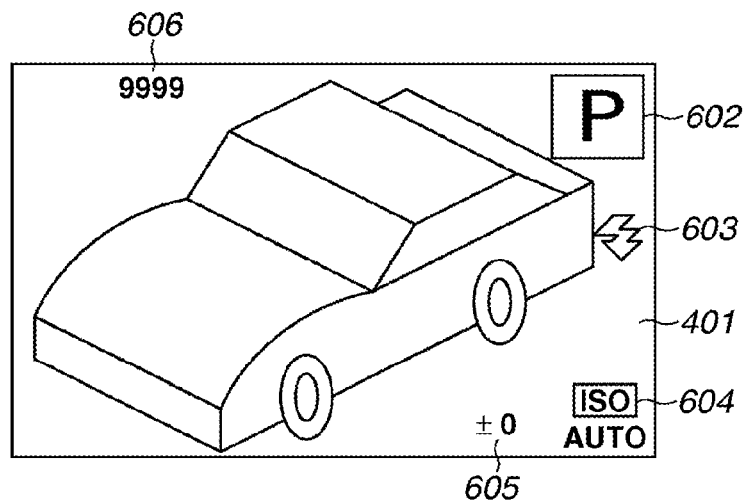
FIGS. 6A to 6C illustrate screen display examples in the FA processing according to the present invention.

FIG. 6A illustrates a display example of the display unit 28 when the zoom position is not the wide-angle end (in a state of zooming-in) in the shooting standby state or during the moving image capturing before the FA button 75 is pressed. In other words, FIG. 6 illustrates a screen display example in the case of NO determination in step S500. A through-image 401 is captured by optical zooming. An icon 602 indicates that a currently set shooting mode is a program AE mode. An icon 603 indicates that current stroboscopic setting is forced light emission. An icon 604 indicates that current ISO sensitivity setting is AUTO. A numerical value 605 indicates that a currently set exposure correction value is ±0. A numerical value 606 indicates how many still images can be yet captured. The icons 602 to 604 and the numerical values 605 and 606 are superimposed on the through-image 401 and displayed. Thus, the display unit 20 displays information regarding shooting set in the digital camera 100 (including current shooting setting) by characters or icons (hereinafter, referred to as shooting information).

In step S501, the current zoom magnification is recorded as a zoom magnification before FA processing (first position) in the system memory 52 (recording control). This recording is executed separately from steps S304 and S319. Even when zooming-out is executed in step S509 described below, the current zoom magnification is kept recorded, which is referred to when the zoom magnification subsequently returns to the original magnification. As long as a zoom position taken before the FA processing is known, not only the zoom magnification but a position of the zoom lens may also be recorded.

In step S502, whether a zoom-out magnification when zooming-out is executed from the current zoom position to the wide-angle end, is smaller than a FA zoom-out magnification. This determination is made based on the current zoom magnification stored in the system memory 52 and a FA zoom magnification predefined as a zoom-out amount by the FA function and stored in the nonvolatile memory 56. The processing proceeds to step S503 when the zoom-out magnification is smaller than the FA zoom-out magnification (YES in step S502), otherwise (No in step S502) the processing proceeds to step S504. The YES determination means that a zoom-out amount necessary for zooming-out from the current zoom position to the wide-angle end is smaller than the zoom-out amount indicated by the FA zoom-out magnification, and the wide-angle end is reached before zooming-out by an amount equal to the FA zoom-out magnification. Thus, the processing proceeds to step S503 to change the FA zoom-out magnification to the zoom-out magnification up to the wide-angle end.

Figure 6B:
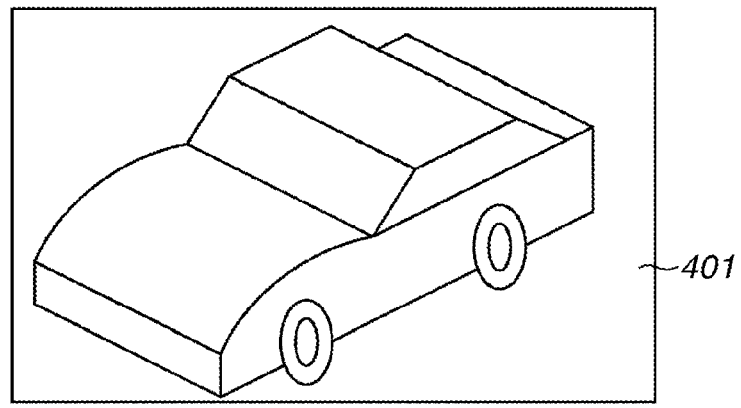

In step S504, the shooting information displayed thus far by the display unit 28 is set to non-display. FIG. 6B illustrates a display example in this case. The display unit 28 displays only the through-image 401, while the other pieces of information are not displayed.

In step S505, whether the FA button 75 has been released (in other words, whether an end of execution of the FA function has been instructed) is determined. The processing proceeds to step S506 when the FA button 75 has been released (YES in step S505), otherwise (NO in step S505) the processing proceeds to step S508.

In step S506, zooming is controlled to release temporary zooming-out that has been executed by the FA processing (zooming-out executed in step S509 described below), thereby setting a zoom magnification to the one immediately before the FA processing is started (zoom magnification recorded in the system memory 52 in step S501). When the zoom magnification before the FA processing recorded in step S501 indicates an electronic zoom area, zoom control is also performed by electronic zooming. This control causes zooming-in. In step S507, the shooting information set to non-display in step S504 is displayed again, and the display state illustrated in FIG. 6A is restored to end the FA processing.

In step S508, it is determined whether zooming-out has been completed by an amount equal to the FA zoom-out magnification. When not completed (NO in step S508), the processing proceeds to step S509 to drive the zoom lens to execute zooming-out, or by electronic zooming if zooming-in has been executed by the electronic zooming, and then the processing returns to step S505. When it is determined that the zooming-out has been completed by the amount equal to the FA zoom-out magnification (YES in step S508), the processing proceeds to step S510. A zoom position when zooming-out is finished is referred to as a second position.

In step S510, whether the shutter button 61 has been half-pressed and a first shutter switch signal SW1 has been generated. When the first shutter switch signal SW1 has been generated (YES in step S510), the processing proceeds to step S511 to clear (delete) the zoom magnification set before the pressing of the FA button 75 and stored in the system memory 52 in step S501. Then, the shooting information set to non-display in step S504 is displayed again, and the processing proceeds to step S310 to start a shooting preparation. Thus, when the shutter button 61 is half-pressed during the FA processing, it is presumed that the user desires still image capturing not at a field angle set before the FA button is pressed but at a current field angle. Accordingly, the FA processing is ended without changing the zoom position set by the temporary zooming-out. In other words, the processing does not return to the zoom position set before the FA function is started.

In step S512, whether the moving image button 74 has been pressed is determined. The processing proceeds to step S513 when it is determined that the moving image button 74 has been pressed (YES in step S512), otherwise (NO in step S512) the processing proceeds to step S515. In step S513, the zoom magnification set before the pressing of the FA button 75 and stored in the system memory 52 in step S501 is cleared (deleted), and then the processing proceeds to step S514. In step S514, whether a moving image is currently captured is determined (so it is determined whether the moving image capturing (moving image recording) operations are being performed or not). When the moving image is not currently captured (NO in step S514), the processing proceeds to step S316 illustrated in FIG. 3 to start capturing the moving image. When currently captured (YES in step S514), the processing proceeds to step S325 illustrated in FIG. 3 to display again the shooting information set to non-display in step S504, thereby ending the moving image capturing. As in the abovementioned case, when the moving image button 74 is pressed, it is presumed that the user desires to start or end moving image capturing not at the field angle set before the FA button is pressed but at the current field angle, the FA processing is ended without changing the zoom position set by the temporary zooming-out.

In step S515, whether the moving image is currently captured is determined (so it is determined whether the moving image capturing (moving image recording) operations are being performed or not). When the moving image is currently captured (YES in step S515), the processing returns to step S505 to be repeated. In other words, in the FA processing during the moving image capturing, frame displaying is not executed in a range equivalent to the field angle set before the pressing of the FA button described in step S516 and below. This action prevents the user from erroneously recognizing that a frame itself may be recorded as a part of the moving image when the frame is displayed during the moving image capturing, and also prevents obstruction to checking of the currently captured moving image. The processing proceeds to step S516 when it is determined that the moving image is not being currently captured (NO in step S515).

In step S516, it is determined whether the frame in the range equivalent to the field angle before the pressing of the FA button 75 has been displayed. The processing proceeds to step S517 to display the frame when it is determined that the frame has not been displayed (NO in step S516), and otherwise (YES in step S516) the proceedings proceeds to step 519.

In step S517, a ratio of a field angle set before the pressing of the FA button 75 to a current field angle is calculated based on the zoom magnification before the pressing of the FA button 75 stored in the system memory and a current zoom magnification which is the temporary zooming-out performed by pressing the FA button 75. Then, a size of an indicator, here exemplified by a frame (or outline), to be displayed by the display unit 28 is calculated based on the acquired ratio and a size (vertical and horizontal lengths) of the display unit 28, and the processing proceeds to step S518. In step S518, the display unit 28 displays a frame 607 of the size acquired in step S517 (so e.g. by superposition of the frame on the captured image). The frame 607 indicates the range equivalent to the field angle before the pressing of the FA button 75. So in other words the frame 607 indicates the region of the image corresponding approximately to the shooting range if the zoom position were to be returned to the first position. As an example, assume that the zoom magnification before the pressing of the FA button, so at the first position as stored in the memory in S304, is 16 times and a current zoom magnification, so at the position, is 4 times. A shooting range at the first position is calculated to be one quarter of the vertical and one quarter of the horizontal range of the shooting range at the second position. Accordingly the size of the frame is calculated to be one-16th of the area of the shooting range (entire current display range) at the second position. So in this example a frame delineating one-16th of the area of the shooting range is displayed with the center of the frame at the center of the screen. A display example in this case is described below referring to FIG. 6C.

In step S519, whether the operation unit 70 has executed a setting change operation is determined. The processing proceeds to step S520 when it is determined that the setting change operation has been executed (YES in step S519), otherwise (NO in step S519) the processing proceeds to step S505. In step S520, while the setting change operation has been executed, no setting is changed, nor any processing is executed (no response). Alternatively, even when determination step of step S519 is omitted, the processing can similarly proceed from step S518 to step S505. In other words, in the present exemplary embodiment, any setting change operation is not accepted during temporary zooming-out performed by the FA processing, thus inhibiting setting changes of the shooting setting items which is changeable in step S307 illustrated in FIG. 3. This arrangement can prevent capturing of any images unintended by the user due to a change of shooting setting made during the FA processing where the through-image is displayed at the zoom position different from an actual shooting field angle. The following operations are not inhibited, but accepted at this time: an operation of turning OFF power by the power switch 72, an operation of switching to another shooting mode by the dial mode 60, an operation of switching to the reproducing mode by pressing the reproducing button included in the operation unit 70, and an operation of switching a display destination by moving the Bali angle monitor unit 26.

Figure 6C:
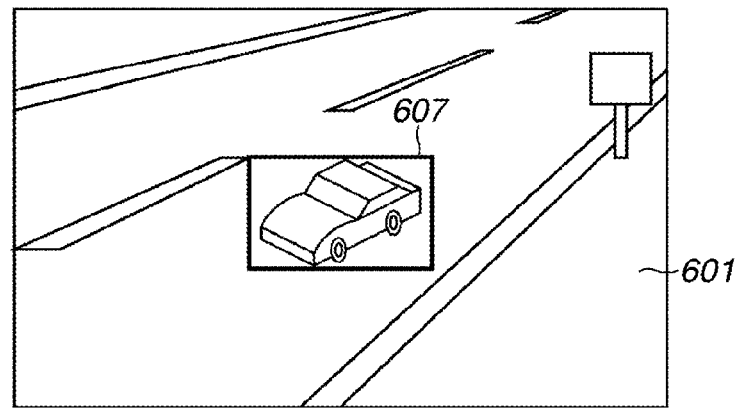

FIG. 6C illustrates a display example of the display unit 28 in step S518 illustrated in FIG. 5 (which includes FIG. 5A and FIG. 5B). A frame 607 indicates a frame equivalent to the field angle before the pressing of the FA button 75, for a through-image 601 captured at the field angle during the temporary zooming-out performed by pressing the FA button 75. The user can accordingly know a location of the shooting range set before the pressing of the FA button 75 in a wider range and how much it has been expanded. By using this FA function, the following is enabled: for example, when a moving object moves out of the shooting range and is lost during shooting by zooming-in to focus on the specific moving object (car illustrated in FIGS. 6A to 6C), the object can be easily found by pressing the FA button 75 to zoom out and see around; and the object focused on can be easily and surely set within the shooting range of an original zoom magnification by moving the digital camera 100 to put the object of the through-image within the frame 607 and releasing the FA button 75.

The shooting information is set to non-display in step S504 for the following reasons.

The first reason is that the FA button 75 for temporary zooming-out is pressed according to user's intention to check the outside of the shooting range before the pressing of the FA button 75, namely, a screen peripheral edge portion outside the frame 607 in the through-image 601 illustrated in FIG. 6C. In this case, if information is displayed on the screen peripheral edge portion, visibility of the screen peripheral edge portion of the through-image 601 is reduced. Thus, during the FA processing, to prevent reduction of visibility of the screen peripheral edge portion of the through-image, the shooting information displayed on the screen peripheral edge portion is deleted.

The second reason is a possibility that the user may confuse the frame 607 displayed during the FA processing (during temporary zooming-out) with another frame having a different meaning such as a focus adjustment frame displayed in another operation mode, an in-focus frame indicating an in-focus range, or a face frame indicating a face range detected by face detection. To prevent such confusion of the user, the shooting information is set to non-display during the FA processing so that the user can surely recognize the ongoing FA processing, and intuitively understand that a meaning of the frame 607 is different from that of a frame displayed in a normal operation mode. Advisably, a display form such as a color, a thickness or a line type of the frame 607 is different from that of the focus adjustment frame, the in-focus frame or the face frame.

Concerning the first and second reasons for setting the shooting information to non-display in step S504, the shooting information can be set semi-transmissive (transmittance is set larger than that before the FA button 75 is pressed) rather than to non-display, which is also effective. While the shooting information is set to non-display, a warning of shooting permission/inhibition is displayed: examples are a LOWBAT warning displayed when a remaining battery life becomes small, a warning displayed when the recording medium 200 is not loaded, a warning when writing in the recording medium 200 is inhibited, and a warning regarding a remaining recordable capacity of the recording medium 200. A recording icon indicating ongoing recording of a moving image, and an icon of an automatic scene determination mode for automatically determining a scene and displaying its results are also displayed.

As described above, according to the present exemplary embodiment, while temporary zooming-out is set by the FA processing, changing of the shooting setting is inhibited. As a result, when the FA processing is released to return the zoom position to its original position, shooting based on setting unintended by the user can be prevented.

The inhibiting of the setting change of the items changeable in step S307 illustrated in FIG. 3 has been described in step S520 as an example. However, the setting change may be accepted depending on setting contents. Setting items permitted to be changed are those receiving no influence from a change in optical characteristics based on zooming-out (change of the zoom position) during the FA processing: the examples are switching between continuous shooting and single shooting, image quality (compression ratio of image data), an image size, ON/OFF of a self timer, the number of seconds and the number of images when ON, ON/OFF of date adding to a captured image, and ON/OFF of eye-closing detection and warning. These items can be set irrespective of the zoom position. On the other hand, the setting change is not accepted as to white balance (WB) adjustment, white shooting for manual WB, setting regarding exposure (shutter speed, diaphragm value, exposure correction, AE lock, or photometric method), ISO sensitivity, and setting regarding a focus. The setting regarding the focus includes a focus adjustment range setting, a focus lock, and an AF method. These items receive an influence from a change in optical characteristics based on the zooming-out during the FA processing, and there is a high possibility that even when adjustment is made by viewing the through-image 601 in step 520, the adjustment may not be appropriate for an image captured after the end of the FA processing when the temporary zooming-out is released.

During the FA processing where the FA button 75 is being pressed, by pressing the operation unit 70, exposure (different from that used for real shooting by the signal SW2) for through-image confirmation can be switched to one of the followings.

Exposure value before the FA button 75 is pressed

Exposure value matched with an entire image captured after zooming-out by pressing the FA button 75 (exposure value matched with a currently captured entire image). The image can easily be viewed without any overexposure or underexposure even outside the frame 607b.

Exposure value matched with the inside of the frame 607 (exposure value matched with the shooting range when the zoom position is set to a position before the FA button 75 is pressed). A range captured by operating the shutter button after the FA button 75 is released can be viewed more easily at brightness close to real shooting.

The control of the system control unit 50 can be performed by one hardware unit, or a plurality of hardware units can share processing to control the entire apparatus.

The present embodiment has been described by way of preferable exemplary embodiments. However, the present invention is not limited to any specific embodiment. Various changes can be made without departing from the spirit and scope of the invention. Each embodiment is only exemplary of the invention, and the embodiments can appropriately be combined.

The exemplary embodiment is directed to the application of the present invention to the digital camera. However, other than the described example, the invention can be applied to any apparatus that has a camera function. In other words, the present invention can be applied to a digital single-lens reflex camera, a digital video camera, a personal computer or a personal digital assistance (PDA) having a shooting function, a mobile phone with a camera, a music player with a camera, a game machine with a camera, and an electronic book reader equipped with a camera.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging control apparatus comprising:
an operation unit configured to instruct change of a shooting setting;
an instruction unit configured to instruct a start or an end of a function for temporarily changing a zoom position;
a zoom control unit configured to perform control to move the zoom position from a first position to a second position according to an instruction for starting the function from the instruction unit, and from the second position to the first position according to an instruction for ending the function from the instruction unit;
a display control unit configured to display, while performing the function, an indicator indicating a shooting range corresponding to the zoom position at the first position on an image display unit; and a control unit configured to perform control, while performing the function, to keep a specific shooting setting even if the operation unit is operated, and before performing the function, to change the specific shooting setting according to an instruction from the operation unit, wherein the specific shooting setting includes at least one of: a white balance setting, an exposure setting, a photometric method setting, a sensitivity setting, a focus adjustment range setting, a focus lock setting, and an autofocus method setting.

2. The imaging control apparatus according to claim 1, wherein the second position is on a wider-angle side than the first position.

3. The imaging control apparatus according to claim 1, wherein the display control unit performs the control to superimpose specific shooting information on an image displayed on the image display unit before performing the function, and not to display the specific shooting information on the image display unit while performing the function.

4. The imaging control apparatus according to claim 1, wherein during capturing of a moving image, the display control unit does not display the indicator of the shooting range even while performing the function.

5. The imaging control apparatus according to claim 1, wherein the zoom control unit performs control to hold the zoom position at the second position until the end of the function is instructed, after the zoom position has been moved to the second position according to the instruction for starting the function from the instruction unit.

6. The imaging control apparatus according to claim 1, further comprising a zoom operation member different from the instruction unit and configured to instruct arbitrary changing of the zoom position.

7. The imaging control apparatus according to claim 1, wherein when shooting preparation is instructed from a shutter operation member while performing the function, the zoom control unit does not move the zoom position to the first position even when ending of the function is instructed from the instruction unit.

8. The imaging control apparatus according to claim 1, wherein in a case of a shooting setting which does not receive any influence from a change in optical characteristics caused by a change of the zoom position, the control unit performs control to change the setting according to a user's operation even while performing the function.

9. The imaging control apparatus according to claim 1, wherein the control unit is configured to perform control to change, among shooting settings, at least one of: switching between continuous shooting and single shooting, a compression ratio, an image size, ON/OFF of a self-timer, the number of seconds of the self-timer and the number of images, ON/OFF of date adding to an image to be captured, and ON/OFF of eye-closing detection and warning, according to a user's operation even while performing the function.

10. The imaging control apparatus according to claim 1, further comprising a switching unit configured to switch an exposure setting for the zoom position at the second position, to at least one of an exposure value, before the start of the function is instructed from the instruction unit an exposure value matched with an entire image captured when the zoom position is at the second position, and an exposure value matched with a part of the entire image captured when the zoom position is at the second position.

11. The imaging control apparatus according to claim 1, further comprising a recording control unit configured to record a zoom position taken before the start of the function, as the first position in a recording unit, wherein the zoom control unit performs control to move the zoom position from the second position to the first position recorded in the recording unit according to an instruction for ending the function from the instruction unit.

12. The imaging control apparatus according to claim 1, wherein the control unit performs control, if a shutter operation member is operated and a shooting instruction is issued while performing the function, to perform shooting without moving the zoom position from the second position, and to record a captured image.

13. The imaging control apparatus according to claim 1, further comprising a mode switching unit configured to accept an operation of switching to any of a plurality of operation modes including at least a plurality of shooting modes, wherein the control unit performs control to switch to another shooting mode according to an operation being performed to the mode switching unit while performing the function.

14. The imaging control apparatus according to claim 1, further comprising a reproduction switching unit configured to accept an operation of switching to a reproducing mode, wherein the control unit performs control to switch to a reproducing mode according to an operation being performed to the reproduction switching unit while performing the function.

15. The imaging control apparatus according to claim 1, further comprising a power operation unit configured to switch power ON and OFF of the imaging apparatus, wherein the control unit performs control to turn OFF power according to an operation being performed to the power operation unit while performing the function.

16. The imaging control apparatus according to claim 1, further comprising:

a first display unit provided outside of a viewfinder; and a second display unit provided inside of a viewfinder, wherein the control unit performs control to switch a display destination between the first display unit and the second display unit according to an operation of switching a display destination being performed while performing the function.

17. The imaging control apparatus according to claim 16, wherein the first display unit is a display unit provided to a Bali angle monitor unit rotatably connected to a main body unit, and wherein the operation of switching a display destination is an operation of moving the Bali angle monitor unit.

18. The imaging control apparatus according to claim 1, wherein the control unit performs control, even if an operation of instructing change of any of a shutter speed setting, a diaphragm value setting, and an exposure correction setting is performed, not to change a setting according to the operation, while performing the function.

19. A method for controlling an imaging apparatus that includes an operation unit configured to instruct change of a shooting setting, and an instruction unit configured to instruct a start or an end of a function for temporarily changing a zoom position, comprising:

performing control to move the zoom position from a first position to a second position according to an instruction for starting the function from the instruction unit, and from the second position to the first position according to an instruction for ending the function from the instruction unit;

displaying, while performing the function, an indicator indicating a shooting range corresponding to the zoom position at the first position on an image display unit; and performing control, while performing the function, to keep a specific shooting setting even if the operation unit is operated, and before performing the function, to change the specific shooting setting according to an instruction from the operation unit, wherein the specific shooting setting includes at least one of: a white balance setting, an exposure setting, a photometric method setting, a sensitivity setting, a focus adjustment range setting, a focus lock setting, and an autofocus method setting.

20. A non-transitory storage medium for storing a program that, when executed, causes a computer to execute a method according to claim 19.

21. An imaging control apparatus comprising:
an operation unit configured to instruct change of an exposure correction setting;
an instruction unit configured to instruct a start or an end of a function for temporarily changing a zoom position;
a zoom control unit configured to perform control to move the zoom position from a first position to a second position according to an instruction for starting the function from the instruction unit, and from the second position to the first position according to an instruction for ending the function from the instruction unit;
a display control unit configured to display, while performing the function, an indicator indicating a shooting range corresponding to the zoom position at the first position on an image display unit; and
a control unit configured to perform control, while performing the function, to keep the exposure correction setting even if the operation unit is operated, and before performing the function, to change the exposure correction setting according to an instruction from the operation unit.

22. An imaging control apparatus comprising:
an operation unit configured to instruct change of a shutter speed setting;
an instruction unit configured to instruct a start or an end of a function for temporarily changing a zoom position;
a zoom control unit configured to perform control to move the zoom position from a first position to a second position according to an instruction for starting the function from the instruction unit, and from the second position to the first position according to an instruction for ending the function from the instruction unit;
a display control unit configured to display, while performing the function, an indicator indicating a shooting range corresponding to the zoom position at the first position on an image display unit; and
a control unit configured to perform control, while performing the function, to keep the shutter speed setting even if the operation unit is operated, and before performing the function, to change the shutter speed setting according to an instruction from the operation unit.

23. An imaging control apparatus comprising:
an operation unit configured to instruct change of a diaphragm value setting;
an instruction unit configured to instruct a start or an end of a function for temporarily changing a zoom position;
a zoom control unit configured to perform control to move the zoom position from a first position to a second position according to an instruction for starting the function from the instruction unit, and from the second position to the first position according to an instruction for ending the function from the instruction unit;
a display control unit configured to display, while performing the function, an indicator indicating a shooting range corresponding to the zoom position at the first position on an image display unit; and
a control unit configured to perform control, while performing the function, to keep the diaphragm value setting even if the operation unit is operated, and before performing the function, to change the diaphragm value setting according to an instruction from the operation unit.

24. A method comprising:
instructing, by an operation unit, change of an exposure correction setting;
instructing, by an instruction unit, a start or an end of a function for temporarily changing a zoom position;
performing, by a zoom control unit, control to move the zoom position from a first position to a second position according to an instruction for starting the function from the instruction unit, and from the second position to the first position according to an instruction for ending the function from the instruction unit;
displaying, while performing the function, an indicator indicating a shooting range corresponding to the zoom position at the first position on an image display unit; and
performing control, while performing the function, to keep the exposure correction setting even if the operation unit is operated, and before performing the function, to change the exposure correction setting according to an instruction from the operation unit.

25. A non-transitory storage medium for storing a program that, when executed, causes a computer to execute a method according to claim 24.

26. A method comprising:
instructing, by an operation unit, change of a shutter speed setting;
instructing, by an instruction unit, a start or an end of a function for temporarily changing a zoom position;
performing control to move the zoom position from a first position to a second position according to an instruction for starting the function from the instruction unit, and from the second position to the first position according to an instruction for ending the function from the instruction unit;
displaying, while performing the function, an indicator indicating a shooting range corresponding to the zoom position at the first position on an image display unit; and
performing control, while performing the function, to keep the shutter speed setting even if the operation unit is operated, and before performing the function, to change the shutter speed setting according to an instruction from the operation unit.

27. A non-transitory storage medium for storing a program that, when executed, causes a computer to execute a method according to claim 26.

28. A method comprising:
instructing, by an operation unit, change of a diaphragm value setting;
instructing, by an instruction unit, a start or an end of a function for temporarily changing a zoom position;
performing control to move the zoom position from a first position to a second position according to an instruction for starting the function from the instruction unit, and from the second position to the first position according to an instruction for ending the function from the instruction unit;

displaying, while performing the function, an indicator indicating a shooting range corresponding to the zoom position at the first position on an image display unit; and performing control, while performing the function, to keep the diaphragm value setting even if the operation unit is operated, and before performing the function, to change the diaphragm value setting according to an instruction from the operation unit.

29. A non-transitory storage medium for storing a program that, when executed, causes a computer to execute a method according to claim 28.

* * * * *